US009662864B2

(12) United States Patent
Botros

(10) Patent No.: US 9,662,864 B2
(45) Date of Patent: May 30, 2017

(54) TIE-LAYER ADHESIVES FOR STYRENIC MULTI-LAYER STRUCTURES

(71) Applicant: Equistar Chemicals, LP, Houston, TX (US)

(72) Inventor: Maged G. Botros, Liberty Township, OH (US)

(73) Assignee: Equistar Chemicals, LP, Houston, TX (US)

(*) Notice: Subject to any disclaimer, the term of this patent is extended or adjusted under 35 U.S.C. 154(b) by 415 days.

(21) Appl. No.: 14/260,894

(22) Filed: Apr. 24, 2014

(65) Prior Publication Data
US 2014/0322542 A1 Oct. 30, 2014

Related U.S. Application Data

(60) Provisional application No. 61/815,811, filed on Apr. 25, 2013.

(51) Int. Cl.
| B32B 27/08 | (2006.01) |
| B32B 7/12 | (2006.01) |
| B32B 27/30 | (2006.01) |
| B32B 27/34 | (2006.01) |
| B32B 27/32 | (2006.01) |
| B29C 47/92 | (2006.01) |
| B29C 47/00 | (2006.01) |
| B29C 47/06 | (2006.01) |
| B29K 23/00 | (2006.01) |
| B29K 77/00 | (2006.01) |

(52) U.S. Cl.
CPC ............ B32B 27/08 (2013.01); B29C 47/065 (2013.01); B29C 47/067 (2013.01); B29C 47/92 (2013.01); B32B 7/12 (2013.01); B32B 27/302 (2013.01); B32B 27/304 (2013.01); B32B 27/306 (2013.01); B32B 27/32 (2013.01); B32B 27/322 (2013.01); B32B 27/327 (2013.01); B32B 27/34 (2013.01); B29C 47/0004 (2013.01); B29C 2947/92695 (2013.01); B29K 2023/0633 (2013.01); B29K 2023/086 (2013.01); B29K 2077/00 (2013.01); B32B 2270/00 (2013.01); B32B 2439/00 (2013.01); Y10T 428/3192 (2015.04); Y10T 428/31544 (2015.04); Y10T 428/31746 (2015.04); Y10T 428/31757 (2015.04); Y10T 428/31913 (2015.04); Y10T 428/31917 (2015.04)

(58) Field of Classification Search
None
See application file for complete search history.

(56) References Cited

U.S. PATENT DOCUMENTS

| 5,591,792 A | 1/1997 | Hattori et al. |
| 6,783,842 B2 | 8/2004 | Niepelt |
| 8,377,562 B2 | 2/2013 | Botros |
| 2003/0091850 A1 | 5/2003 | Niepelt |
| 2007/0167569 A1 | 7/2007 | Botros |
| 2009/0171022 A1* | 7/2009 | Botros ............... C09J 123/0815 525/57 |
| 2011/0159297 A1* | 6/2011 | Botros .................... B32B 27/00 428/422 |
| 2013/0048131 A1 | 2/2013 | Smillie et al. |

FOREIGN PATENT DOCUMENTS

| CN | 102753343 A | 10/2012 |
| EP | 0664327 A1 | 7/1995 |
| WO | WO-2009085145 A1 | 7/2009 |

OTHER PUBLICATIONS

PCT International Search Report and Written Opinion—Mailed Aug. 25, 2014 for Corresponding PCT/US2014/035310.

* cited by examiner

Primary Examiner — Sheeba Ahmed

(57) ABSTRACT

A multilayer structure and a method for forming a multilayer structure, the multilayer structure includes: (A) a first polyolefin layer; (B) a styrene polymer layer; (C) a second polyolefin layer; and (D) at least one tie-layer comprising a tie-layer composition. The tie-layer composition includes: (1) 25 to 75 wt. %, based upon the total weight of the tie-layer composition, of a first copolymer, wherein the first copolymer comprises ethylene derived units and units derived from a $C_{4-8}$ α-olefin; (2) 5 to 25 wt. %, based upon the total weight of the tie-layer composition, of a polyethylene resin grafted with an ethylenically unsaturated carboxylic acid or acid derivative; (3) 20 to 50 wt. %, based upon the total weight of the tie-layer composition, of a triblock copolymer composition; and (4) optionally, 0.001 to 20 wt. %, based upon the total weight of the tie-layer composition, of a low density polyethylene.

16 Claims, No Drawings

TIE-LAYER ADHESIVES FOR STYRENIC MULTI-LAYER STRUCTURES

CROSS-REFERENCES TO RELATED APPLICATIONS

This application claims the benefit of U.S. Provisional Application No. 61/815,811, filed Apr. 25, 2013, the contents of which are incorporated herein by reference in its entirety.

TECHNICAL FIELD

In general, the present disclosure relates to the field of chemistry. More specifically, the present disclosure relates to non-bridged metallocene complexes which may be used in the polymerization of olefins. In general, the present disclosure relates to the field of polymer chemistry. In particular, the present disclosure relates to polyolefins, polyethylene, and grafted polyethylene. More particularly, the present disclosure relates to tie-layer adhesive compositions that may be used to bond styrene based polymers and high impact polystyrene to other polymer layers in a multi-layer structure.

BACKGROUND OF THE INVENTION

In multilayer packaging, various layers are often combined to provide a final product that has the characteristics of the separate layers. Structures that include different types of polyethylene, polypropylene, and ethylene vinyl acetate together with barrier layers such as ethylene vinyl alcohol (EVOH) and polyamide (PA) are often used in number of applications, including packaging. For example, these types of structures may be used in food packaging applications for meat and cheese. In such multilayer constructions, polypropylene typically provides stiffness, temperature resistance and scuff resistance. Polyethylene typically provides clarity and tear resistance, seals at a lower temperature and is softer than polypropylene. Styrene polymers can be included in such structures to provide structural integrity. In designing multilayered structures, adhering the separate layers to one another is a challenge that must be addressed. This is particularly the case for structures containing both polypropylene and polyethylene layers, and also styrene polymer layers in thermoforming applications together with barrier layers. There is a need to develop a product that utilizes a single type of tie layer in a multilayer structure because in a commercial setting, the capital investment that would be required for multiple extruders, and additional extrusion steps translate to higher operating costs.

U.S. Patent Publication No. 2007/0167569 discloses adhesives containing styrene-isoprene-styrene polymers in multilayer structures containing styrene polymer layers. U.S. Patent Publication No. 2009/0171022 discloses adhesives containing styrene-isoprene-styrene/styrene-butadiene-styrene polymer blends in multilayer structures containing styrene polymer layers. U.S. Pat. No. 6,184,298 discloses adhesives containing unmodified styrene-based elastomers in multilayer structures containing polyethylene and polypropylene. However, a continuing need exists for multilayer structures containing layers of polyethylene, propylene polymers, and styrene polymers, having a common tie layer with the capability of adhering all layers in the structure.

BRIEF SUMMARY OF THE INVENTION

In general, the present disclosure relates to multilayer structures that contain a tie-layer having a specific composition and a method for making a multilayer structure. In general embodiments, the multilayer structure comprises:
(A) a first polyolefin layer;
(B) a styrene polymer layer;
(C) a second polyolefin layer; and
(D) at least one tie-layer.

In some embodiments, the multilayered structure comprises more than one tie-layer and each tie-layer is composed of the same tie-layer composition. In specific embodiments, a tie-layer is positioned between the first polymer layer and the styrene polymer layer. In particular embodiments, a tie-layer is positioned between the styrene polymer layer and the second polymer layer. In some embodiments, the styrene polymer layer is positioned between the first polymer layer and the second polymer layer, the first polymer layer and the styrene polymer layer is separated by a tie-layer, and the second polymer layer and the styrene polymer layer is separated by a tie-layer. In specific embodiments, the multilayer structure has the following arrangement: a first polyolefin layer/a tie-layer/a styrene polymer layer/a tie-layer/a second polyolefin layer.

In general, a tie-layer has the following composition:
(1) 25 to 75 wt. %, based upon the total weight of the tie-layer composition, of a first copolymer, wherein the first copolymer comprises ethylene derived units and units derived from a $C_{4-8}$ α-olefin;
(2) 5 to 25 wt. %, based upon the total weight of the tie-layer composition, of a polyethylene resin grafted with an ethylenically unsaturated carboxylic acid or acid derivative;
(3) 20 to 50 wt. %, based upon the total weight of the tie-layer composition, of a triblock copolymer composition, and
(4) optionally, 0.001 to 20 wt. %, based upon the total weight of the tie-layer composition, of a low density polyethylene (LDPE).

In some embodiments, the tie-layer composition has a melt flow rate (MFR) of 1-5 g/10 min (ASTM D 1238, 2.16 kg at 190° C.). In some embodiments, the tie-layer composition has a MFR of 2-4 g/10 min (ASTM D 1238, 2.16 kg at 190° C.). In some embodiments, the tie-layer composition has a MFR of 2.5-3.5 g/10 min (ASTM D 1238, 2.16 kg at 190° C.). In some embodiments, the tie-layer composition has a MFR of about 1 g/10 min (ASTM D 1238, 2.16 kg at 190° C.). In some embodiments, the tie-layer composition has a MFR of about 2 g/10 min (ASTM D 1238, 2.16 kg at 190° C.). In some embodiments, the tie-layer composition has a MFR of about 3 g/10 min (ASTM D 1238, 2.16 kg at 190° C.). In some embodiments, the tie-layer composition has a MFR of about 4 g/10 min (ASTM D 1238, 2.16 kg at 190° C.). In some embodiments, the tie-layer composition has a MFR of about 5 g/10 min (ASTM D 1238, 2.16 kg at 190° C.).

In some embodiments, the first copolymer is derived from a metallocene.

In some embodiments, the multilayer structure includes a barrier layer selected from EVOH, polyamides, co-extruded structures of EVOH and polyamides, polyvinylidene chloride, or polychlorotrifluoroethylene. In some embodiments, the barrier layer is selected from EVOH, polyamides or co-extruded structures of EVOH and polyamides. In specific embodiments, the barrier layer is EVOH. In some embodiments, the polyamide is selected from nylon 6; nylon 6,6; nylon 12; nylon 6,12; nylon 6,66; or mixtures thereof. In some embodiments, the co-extruded structure is a combination of EVOH and polyamide and is selected from polyamide/EVOH/polyamide or EVOH/polyamide.

In some embodiments, the styrene polymer layer is a blend of polystyrene and high impact polystyrene.

In some embodiments, the melt index of the styrene-butadiene-styrene triblock copolymer is 12 to 20 g/10 min.

In some embodiments, the multilayer structure has a structure selected from the group consisting of:
PS/tie-layer/barrier/tie-layer/PP/tie-layer/PE,
HIPS/tie-layer/barrier/tie-layer/PE/tie-layer/PP,
PS/tie-layer/barrier/tie-layer/PE/tie-layer/PP,
HIPS/tie-layer/barrier/tie-layer/PP/tie-layer/PE,
PS+HIPS/tie-layer/barrier/tie-layer/PP/tie-layer/PE,
PS+HIPS/tie-layer/barrier/tie-layer/PE/tie-layer/PP,
PS/tie-layer/barrier/tie-layer/PE+PP
HIPS/tie-layer/barrier/tie-layer/PE+PP, and
PS+HIPS/tie-layer/barrier/tie-layer/PE+PP.

In specific embodiments, the multilayer structure is selected from the group consisting of: HIPS/tie-layer/barrier/tie-layer/PE+PP, and PS+HIPS/tie-layer/barrier/tie-layer/PE+PP.

In some embodiments, the multilayer structure includes a polyethylene resin that is grafted with 0.5 to 5 weight percent maleic anhydride and has a melt index from 0.5 to 20 g/10 min.

In specific embodiments, the multilayer structure includes a polyethylene resin that has a density from 0.945 to 0.965 g/cm$^3$ and is grafted with 0.75 to 2.5 weight percent maleic anhydride.

In particular embodiments, the multilayer structure includes a polyethylene resin that has a density from 0.910 to 0.930 g/cm$^3$ and is grafted with 0.75 to 2.5 weight percent maleic anhydride.

In some embodiments, the multilayer structure includes a triblock copolymer composition that comprises: (1) from about 45 to about 55 wt. %, based upon the total weight of the triblock copolymer composition, of a SBS triblock copolymer; and (2) from about 45 to about 55 wt. %, based upon the total weight of the triblock copolymer composition, of a SIS triblock copolymer.

In some embodiments, the multilayer structure includes a triblock copolymer composition has a weight ratio of styrene-isoprene-styrene (SIS) triblock copolymer to styrene-butadiene-styrene (SBS) triblock copolymer from 5:1 to 1:5.

In general, the present disclosure provides a process for forming a multilayer structure comprising at least the step of:
co-extruding a multilayer structure, the multilayer structure comprising:
(A) a first polyolefin layer;
(B) a styrene polymer layer;
(C) a second polyolefin layer; and
(D) at least one tie-layer.

In some embodiments, the co-extruding step produces a multilayered structure that includes a tie-layer composed of:
(1) 25 to 75 wt. %, based upon the total weight of the tie-layer composition, of a first copolymer, wherein the first copolymer comprises ethylene derived units and units derived from a C4-8 α-olefin;
(2) 5 to 25 wt. %, based upon the total weight of the tie-layer composition, of a polyethylene resin grafted with an ethylenically unsaturated carboxylic acid or acid derivative;
(3) 20 to 50 wt. %, based upon the total weight of the tie-layer composition, of a triblock copolymer composition; and
(4) optionally, 0.001 to 20 wt. %, based upon the total weight of the tie-layer composition, of a low density polyethylene (LDPE).

In some embodiments the co-extruding step includes co-extruding a barrier layer. The barrier layer is made of a composition selected from ethyl vinyl alcohol (EVOH), polyamides, co-extruded structures of EVOH and polyamides, polyvinylidene chloride, polychlorotrifluoroethylene, or combinations thereof. In particular embodiments, the barrier layer is made of a composition selected from EVOH, polyamides or co-extruded structures of EVOH and polyamides. In specific embodiments, the barrier layer is made of a composition comprising EVOH.

In general embodiments, the process for make the multilayered structure may be modified such that the co-extruding step produces a multilayer structure having the following arrangement: a first polyolefin layer/a tie-layer/a styrene polymer layer/a tie-layer/a second polyolefin layer. In particular embodiments, the process for making the multilayered structure may be modified such that the co-extruding step produces a multilayer structure having one of the following arrangements:
(1) PS/tie-layer/barrier/tie-layer/PP/tie-layer/PE,
(2) HIPS/tie-layer/barrier/tie-layer/PE/tie-layer/PP,
(3) PS/tie-layer/barrier/tie-layer/PE/tie-layer/PP,
(4) HIPS/tie-layer/barrier/tie-layer/PP/tie-layer/PE,
(5) PS+HIPS/tie-layer/barrier/tie-layer/PP/tie-layer/PE,
(6) PS+HIPS/tie-layer/barrier/tie-layer/PE/tie-layer/PP, or
(7) PS/tie-layer/barrier/tie-layer/PE+PP
(8) HIPS/tie-layer/barrier/tie-layer/PE+PP, or
(9) PS+HIPS/tie-layer/barrier/tie-layer/PE+PP.

In specific embodiments, the process is modified such that the co-extruding step produces a multilayer structure having one of the following arrangements:
(1) PS+HIPS/tie-layer/barrier/tie-layer/PP/tie-layer/PE, or
(2) PS+HIPS/tie-layer/barrier/tie-layer/PE/tie-layer/PP.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Definitions

By "conjugated diene-based elastomer" we mean any conjugated diene-containing polymers and copolymers which have a glass transition temperature (Tg) below room temperature (25° C.). In other words, the conjugated diene-containing polymers and copolymers are in elastomeric or rubber state at room temperature. Examples of conjugated diene-based elastomers include polybutadiene, polyisoprene, butadiene-vinyl aromatic random and block copolymers, isoprene-vinyl aromatic random and block copolymers, hydrogenated butadiene-vinyl aromatic block copolymers, hydrogenated isoprene-vinyl aromatic block copolymers, the like, and mixtures thereof. Preferably, the conjugated diene-based elastomers are selected from the group consisting of butadiene-styrene block copolymers, isoprene-styrene block copolymers, hydrogenated butadiene-styrene block copolymers, hydrogenated isoprene-styrene block copolymers, the like, and mixture thereof. More preferably, the conjugated diene-based elastomers are selected from the group consisting of styrene-butadiene-styrene triblock copolymers (SBS), styrene-isoprene-styrene triblock copolymers (SIS), the like, and mixtures thereof.

Testing

ASTM D 792 Test Methods for Density and Specific Gravity (Relative Density) of Plastics by Displacement: The term "ASTM D 792" as used herein refers to the standard test method for determining the specific gravity (relative density) and density of solid plastics in forms such as sheets, rods, tubes, or molded items. The test method includes determining the mass of a specimen of the solid plastic in air, determining the apparent mass of the specimen upon immersion in a liquid, and calculating the specimen's specific gravity (relative density). This test method was approved on Jun. 15, 2008 and published July 2008, the contents of which are incorporated herein by reference in its entirety. For the referenced ASTM standards, visit the ASTM website, www.astm.org, or contact ASTM Customer Service at service@astm.org.

ASTM D 1238 is entitled "Test Method for Melt Flow Rates of Thermoplastics by Extrusion Plastometer." The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

ASTM D 1876 is entitled "Standard Test Method for Peel Resistance of Adhesives (T-Peel Test)." The term "ASTM D 1876" as used herein refers to a test method for determining the relative peel resistance of adhesive bonds between flexible adherends by means of a T-type specimen. The accuracy of the results of strength tests of adhesive bonds will depend on the conditions under which the bonding process is carried out. This test method was approved on Oct. 10, 2001 and published December 2001, the contents of which are incorporated herein by reference in its entirety. For the referenced ASTM standards, visit the ASTM website, www.astm.org, or contact ASTM Customer Service at service@astm.org.

Multilayer Structure

Adhesive compositions suitable for use as tie-layers for multi-layer constructions having one or more styrene polymer layers plus a low density polyethylene (HPDE) are provided herein. More specifically, the adhesives as disclosed herein provide improved adhesion between styrenic polymers, such as polystyrene and high impact polystyrene (HIPS), and barrier resin polymers, such as EVOH and polyamides, used in multi-layer films and sheets such as those used in thermoforming applications for the production of molded cups, trays, etc.

In general, the multilayer structure comprises:
(A) a first polyolefin layer;
(B) a styrene polymer layer;
(C) a second polyolefin layer; and
(D) at least one tie-layer.

The general process for forming the multilayer structure includes co-extruding the following layers to form a multilayer structure:
(A) a first polyolefin layer;
(B) a styrene polymer layer;
(C) a second polyolefin layer; and
(D) a tie-layer comprising:
  (1) 25 to 75 wt. %, based upon the total weight of the tie-layer composition, of a first copolymer, wherein the first copolymer comprises ethylene derived units and units derived from a C4-8 α-olefin;
  (2) 5 to 25 wt. %, based upon the total weight of the tie-layer composition, of a polyethylene resin grafted with an ethylenically unsaturated carboxylic acid or acid derivative;
  (3) 20 to 50 wt. %, based upon the total weight of the tie-layer composition, of a triblock copolymer composition; and
  (4) optionally, 0.001 to 20 wt. %, based upon the total weight of the tie-layer composition, of a low density polyethylene (LDPE).

In some embodiments, the co-extruding step includes co-extruding a barrier layer. In additional and alternate embodiments, the barrier layer is a co-extruded structure. In particular embodiments, the co-extruded structure comprises EVOH and polyamides. In specific embodiments, the barrier layer is composed of an EVOH and polyamides composition having the following layered arrangement polyamide/EVOH/polyamide or EVOH/polyamide.

In general embodiments, the process for make the multilayered structure may be modified such that the co-extruding step produces a multilayer structure having the following arrangement: a first polyolefin layer/a tie-layer/a styrene polymer layer/a tie-layer/a second polyolefin layer. In specific embodiments, the process for making the multilayered structure may be modified such that the co-extruding step produces a multilayer structure having one of the following arrangements:
(1) PS/tie-layer/barrier/tie-layer/PP/tie-layer/PE,
(2) HIPS/tie-layer/barrier/tie-layer/PE/tie-layer/PP,
(3) PS/tie-layer/barrier/tie-layer/PE/tie-layer/PP,
(4) HIPS/tie-layer/barrier/tie-layer/PP/tie-layer/PE,
(5) PS+HIPS/tie-layer/barrier/tie-layer/PP/tie-layer/PE,
(6) PS+HIPS/tie-layer/barrier/tie-layer/PE/tie-layer/PP, or
(7) PS/tie-layer/barrier/tie-layer/PE+PP
(8) HIPS/tie-layer/barrier/tie-layer/PE+PP, or
(9) PS+HIPS/tie-layer/barrier/tie-layer/PE+PP.

In specific embodiments, the process is modified such that the co-extruding step produces a multilayer structure having one of the following arrangements:
(1) PS+HIPS/tie-layer/barrier/tie-layer/PP/tie-layer/PE, or
(2) PS+HIPS/tie-layer/barrier/tie-layer/PE/tie-layer/PP.

First Polyolefin Layer

In general, the first polyolefin layer may be a first propylene polymer (PP) layer, a first polyethylene (PE) layer, or a combination thereof (PE+PP).

The first propylene polymer layer (PP) preferably includes a layer selected from a homopolymer of propylene, a copolymer of propylene and ethylene or $C_4$-$C_{10}$ α-olefins where the ethylene or $C_4$-$C_{10}$ α-olefin comonomers are present in amounts up to 10 wt. %, based upon the total weight of the copolymer of propylene, or mixtures thereof. The propylene homopolymers and copolymers can be produced using either Ziegler Natta or single-site catalysts, e.g., metallocene catalysts. When the first propylene polymer is a copolymer, it preferably contains 2 to 6 wt. %, based upon the total weight of the copolymer, of ethylene derived units as a comonomer. In some examples, the first propylene polymer layer made of a propylene homopolymer.

The first polyethylene layer (PE) is selected from ethylene homopolymers, and ethylene copolymers comprising ethylene derived units and units derived from $C_4$-$C_8$ α-olefins, or mixtures thereof. The first polyethylene layer can also include co-extruded structures of polyethylene with other ethylene copolymers such as ethylene-vinyl acetate copolymer and ethylene methyl acrylate copolymer. Ethylene homopolymers and ethylene-$C_4$-$C_8$ α-olefin copolymers include very low density polyethylene (VLDPE), low density polyethylene (LDPE), linear low density polyethylene (LLDPE), medium density polyethylene (MDPE) and high density polyethylene (HDPE). VLDPE is defined as having a density of 0.860 to 0.910 g/cm$^3$, as measured by ASTM D 792. LDPE and LLDPE are defined as having densities in the range 0.910 to 0.930 g/cm$^3$. MDPE is defined as having a density of 0.930 to 0.945 g/cm$^3$. HDPE is defined as having a density of at least 0.945 g/cm$^3$, preferably from 0.945 to 0.969 g/cm$^3$. The ethylene homopolymers and copolymers preferably have melt indexes (MIs), as measured by ASTM D 1238, condition 190° C./2.16 kg, from 0.01 to 400 dg/min, preferably, from 0.1 to 200 dg/min., more preferably from 1 to 100 dg/min. Preferably, the first polyethylene layer is LDPE.

The first polyolefin layer may include a blend of polyethylene and polypropylene (PE+PP). When the first polyolefin layer is PE+PP, polyethylene is the majority component. In some embodiments, the PE component is selected from any PE component as described herein. In some embodiments, the PP component is selected from any PP component as described herein. In some embodiments, the PE component is present in an amount ranging from 50 to 100 wt. %, based upon the total weight of the PE+PP polymer blend, with the PP component being the balance.

Styrene Polymer Layer

The styrene polymer layer can be polystyrene (PS), high impact polystyrene (HIPS) or a blend of HIPS and polystyrene (PS+HIPS). The HIPS may contain up to about 30 wt. %, based upon the total weight of the HIPS, of an elastomer. In some examples, the HIPS may contain from about 8 to about 15 wt. %, based upon the total weight of the HIPS, of an elastomer. Suitable elastomers for use as impact modifiers for HIPS resins include natural rubber and synthetic rubbers, such as styrene-butadiene rubber, acrylonitrile-butadiene rubber, butyl rubber, chloroprene rubber, silicone rubber, acryl rubber, urethane rubber, polybutadiene rubber, ethylene propylene rubber, etc. In high impact polystyrene resin compositions, the elastomer exists as a dispersed phase in the styrene polymer. In the co-extruded structures of polyethylene and EVA, the types of polyethylene are as described above. Preferably, the styrene polymer layer is PS+HIPS.

Second Polyolefin Layer

In general, the second polyolefin layer may be a second propylene polymer (PP) layer, a second polyethylene (PE) layer, or a combination thereof (PE+PP). In some examples, the first polyolefin layer and the second polyolefin layer have the same chemical composition. In some examples, the first polyolefin layer and the second polyolefin layer have the same physical characteristics (e.g., thickness, length, tensile strength, etc.) In some examples, the first polyolefin layer and the second polyolefin layer are different chemical compositions. In additional examples, the first polyolefin layer and the second polyolefin layer have different physical characteristics.

The second propylene polymer layer (PP) preferably includes a layer selected from a homopolymer of propylene, a copolymer of propylene with ethylene or $C_4$-$C_{10}$ α-olefins where the ethylene or $C_4$-$C_{10}$ α-olefin comonomers are present in amounts up to 10 wt. %, based upon the total weight of the copolymer of propylene, or mixtures thereof. The propylene homopolymers and copolymers can be produced using either Ziegler Natta or single-site catalysts, e.g., metallocene catalysts. When the second propylene polymer is a copolymer, it preferably contains 2 to 6 wt. %, based upon the total weight of the copolymer, of ethylene derived units as a comonomer. In some examples, the second propylene polymer layer made of a propylene homopolymer.

The second polyethylene layer (PE) is selected from ethylene homopolymers and ethylene copolymers comprising ethylene derived units and units derived from $C_4$-$C_8$ α-olefins, or mixtures thereof. The second polyethylene layer can also include co-extruded structures of polyethylene with other ethylene copolymers such as ethylene-vinyl acetate copolymer and ethylene methyl acrylate copolymer. Ethylene homopolymers and ethylene-$C_4$-$C_8$ α-olefin copolymers include very low density polyethylene (VLDPE), low density polyethylene (LDPE), linear low density polyethylene (LLDPE), medium density polyethylene (MDPE) and high density polyethylene (HDPE). VLDPE is defined as having a density of 0.860 to 0.910 g/cm$^3$, as measured by ASTM D 792. LDPE and LLDPE are defined as having densities in the range 0.910 to 0.930 g/cm$^3$. MDPE is defined as having a density of 0.930 to 0.945 g/cm$^3$. HDPE is defined as having a density of at least 0.945 g/cm$^3$, preferably from 0.945 to 0.969 g/cm$^3$. The ethylene homopolymers and copolymers preferably have melt indexes (MIs), as measured by ASTM D 1238, condition 190/2.16, from 0.01 to 400 dg/min, preferably, from 0.1 to 200 dg/min., more preferably from 1 to 100 dg/min. Preferably, the second polyethylene layer is LDPE.

The second polyolefin layer may include a blend of polyethylene and polypropylene (PE+PP). When the second polyolefin layer is PE+PP, polyethylene is the majority component. In some embodiments, the PE component is selected from any PE component as described herein. In some embodiments, the PP component is selected from any PP component as described herein. In some embodiments, the PE component is present in an amount ranging from 50 to 100 wt. %, based upon the total weight of the PE+PP polymer blend, with the PP component being the balance.

Tie-Layer

In some embodiments, at least one tie-layer may be present in the multilayer structure. In some embodiments, where more than one tie-layer is present in the multilayer structure, each tie-layer is composed of the same tie-layer composition. In alternative embodiments, each tie-layer may have different tie-layer compositions.

The multilayered structure may be extruded in a manner that may position the tie-layer between any combination(s) of layers. For example, a tie-layer may be positioned between the first polymer layer and the styrene polymer layer. A tie-layer may be positioned between the styrene polymer layer and the second polymer layer. Some multilayered structures may be extruded to produce a final structure where the styrene polymer layer is positioned between the first polymer layer and the second polymer layer, the first polymer layer and the styrene polymer layer is separated by a tie-layer, and the second polymer layer and the styrene polymer layer is separated by a tie-layer. A multilayer structure may have the following arrangement: a first polyolefin layer/a tie-layer/a styrene polymer layer/a tie-layer/a second polyolefin layer.

The adhesive compositions, also referred to herein as adhesive blends and/or tie-layer adhesives, are comprised of: (1) a first copolymer; (2) a grafted polyethylene; (3) a triblock copolymer composition; and (4) optionally, a low density polyethylene. In some embodiments, the tie-layer adhesive may be comprised of: (1) a first copolymer; (2) a grafted polyethylene; and (3) a triblock copolymer composition. In additional embodiments, the tie-layer adhesive may be comprised of: (1) a first copolymer; (2) a grafted polyethylene; (3) a triblock copolymer composition; and (4) a low density polyethylene. More specifically, the tie-layer composition may include:

(1) 25 to 75 wt. %, based upon the total weight of the tie-layer composition, of a first copolymer, wherein the first copolymer comprises ethylene derived units and units derived from a $C_{4-8}$ α-olefin;

(2) 5 to 25 wt. %, based upon the total weight of the tie-layer composition, of a polyethylene resin grafted with an ethylenically unsaturated carboxylic acid or acid derivative;

(3) 20 to 50 wt. %, based upon the total weight of the tie-layer composition, of a triblock copolymer composition; and (4) optionally, 0.001 to 20 wt. %, based upon the total weight of the tie-layer composition, of a low density polyethylene (LDPE).

The first copolymer is a copolymer of ethylene and at least one $C_{4-8}$ α-olefin (e.g., butene, pentene, hexene, heptene and/or octene). In specific embodiments, the first copolymer may be a linear low density polyethylene (LLDPE). In particular embodiments, the LLDPE may be an ethylene-$C_4$-$C_8$ α-olefin linear low density copolymer. More specifically, the LLDPE may be an ethylene-butene-1 linear low density copolymer.

In general, the first copolymer has a density from 0.900 to 0.933 g/cm$^3$. The first copolymer may have a density from 0.910 to 0.925 g/cm$^3$ and/or 0.915 to 0.920 g/cm$^3$. In specific embodiments, the first copolymer has a density of about 0.918 g/cm$^3$. In general, the first copolymer has a melt flow rate from 1.5 to 40 g/10 min (measured by ASTM D 1238 at 190° C./2.16 kg). The first copolymer may have a melt flow rate from about 2.0 to about 3.5 g/10 min. In specific embodiments, the first copolymer has a melt flow rate of about 1.8 g/10 min, about 2.0 g/10 min, about 2.2 g/10 min, about 2.4 g/10 min, about 2.6 g/10 min, about 2.8 g/10 min, about 3.0 g/10 min, about 3.2 g/10 min, about 3.4 g/10 min, about 3.5 g/10 min, about 3.7 g/10 min, and/or about 4.0 g/10 min.

In general, the first copolymer is present in the tie-layer composition in an amount ranging from 25 to 75 wt. %, based upon the total weight of the tie-layer composition. The first copolymer may be present in the tie-layer composition in an amount ranging from 30 to 65 wt. %, based upon the total weight of the tie-layer composition. The first copolymer may be present in the tie-layer composition in an amount ranging from 40 to 60 wt. %, based upon the total weight of the tie-layer composition. The first copolymer may be present in the tie-layer composition in an amount ranging from about 45 to 60 wt. %, based upon the total weight of the tie-layer composition. The first copolymer may be present in the tie-layer composition in an amount of about 47.8 wt. %, based upon the total weight of the tie-layer composition. The first copolymer may be present in the tie-layer composition in an amount of about 49.8 wt. %, based upon the total weight of the tie-layer composition. The first copolymer may be present in the tie-layer composition in an amount of about 51.8 wt. %, based upon the total weight of the tie-layer composition. The first copolymer may be present in the tie-layer composition in an amount of about 53.8 wt. %, based upon the total weight of the tie-layer composition. The first copolymer may be present in the tie-layer composition in an amount of about 55.8 wt. %, based upon the total weight of the tie-layer composition. The first copolymer may be present in the tie-layer composition in an amount of about 57.8 wt. %, based upon the total weight of the tie-layer composition. The first copolymer may be present in the tie-layer composition in an amount of about 58.8 wt. %, based upon the total weight of the tie-layer composition. The first copolymer may be present in the tie-layer composition in an amount of about 59.8 wt. %, based upon the total weight of the tie-layer composition.

In general, the tie-layer composition comprises a grafted polyethylene. The grafted polyethylene is a polyethylene resin that is grafted with an ethylenically unsaturated carboxylic acid or acid derivative. In general, the tie-layer composition contains 5 to 25 wt. %, based upon the total weight of the tie-layer composition, of a grafted polyethylene. The tie-layer composition may contain from 5 to 20 wt. %, based upon the total weight of the tie-layer composition, of a grafted polyethylene. The tie-layer composition may contain from 5 to 15 wt. %, based upon the total weight of the tie-layer composition, of a grafted polyethylene. The tie-layer composition may contain from 8 to 12 wt. %, based upon the total weight of the tie-layer composition, of a grafted polyethylene. The tie-layer composition may contain about 8 wt. %, based upon the total weight of the tie-layer composition, of a grafted polyethylene. The tie-layer composition may contain about 9 wt. %, based upon the total weight of the tie-layer composition, of a grafted polyethylene. The tie-layer composition may contain about 10 wt. %, based upon the total weight of the tie-layer composition, of a grafted polyethylene. The tie-layer composition may contain about 11 wt. %, based upon the total weight of the tie-layer composition, of a grafted polyethylene. The tie-layer composition may contain about 12 wt. %, based upon the total weight of the tie-layer composition, of a grafted polyethylene.

The grafted polyethylene resin is obtained by reacting unsaturated carboxylic acids and carboxylic acid anhydrides, or derivatives thereof, with polyethylene under grafting conditions. The grafting monomers, i.e., acid, anhydride or derivative, are incorporated along the polyethylene or polypropylene backbone. The polyethylene to be grafted includes ethylene homopolymers and copolymers of ethylene with propylene, butene, 4-methyl pentene, hexene, octene, or mixtures thereof. Preferably, the polyethylene to be grafted is HDPE or LLDPE. Most preferably, the polyethylene to be grafted is HDPE. In specific embodiments, the grafted polyethylene is a high density polyethylene that contains about 1.9 wt. % of maleic anhydride, based upon the total weight of the grafted polyethylene.

Carboxylic acids or anhydrides useful as grafting monomers include compounds such as acrylic acid, maleic acid, fumaric acid, citaconic acid, mesaconic acid, maleic anhydride, 4-methyl cyclohex-4-ene-1,2-dicarboxylic acid or anhydride, bicyclo(2.2.2)oct-5-ene-2,3-dicarboxylic acid or anhydride 2-oxa-1,3-diketospiro(4,4)non-7-ene, bicyclo (2.2.1)hept-5-ene-2,3-dicarboxylic acid or anhydride, tetrahydrophthalic acid or anhydride, x-methylbicyclo(2.2.1) hept-5-ene-2,3-dicarboxylic acid or anhydride, nadic anhydride, methyl nadic anhydride, himic anhydride, and methyl himic anhydride. Maleic anhydride is a particularly useful grafting monomer. Acid and anhydride derivatives which can be used to graft the polyethylene or polypropylene include dialkyl maleates, dialkyl fumarates, dialkyl itaconates, dialkyl mesaconates, dialkyl citraconates and alkyl crotonates.

Grafting is accomplished by thermal and/or mechanical means in accordance with known procedures, with or without a free-radical generating catalyst such as an organic peroxide, where the grafted sample is prepared by heating a mixture of the polyolefin and graft monomer(s), with or without a solvent, while subjecting it to high shear. Preferably, the grafted products are prepared by melt blending the polyethylene or polypropylene in the substantial absence of a solvent, in the presence of the grafting monomer in a shear-imparting reactor, such as an extruder. Twin screw extruders such as those marketed by Werner-Pfleiderer under the designations ZSK-30, ZSK-53, ZSK-83, ZSK-90 and ZSK-92 are especially useful for carrying out the grafting operation. Preferably, the amount of acid or acid derivative comonomer(s) grafted onto the polyethylene or polypropylene ranges from 0.1 to 4 weight percent, preferably from 0.5 to 3.0 weight percent. Preferably, when maleic anhydride is grafted onto HDPE or LLDPE, the grafted maleic anhydride concentration is 0.5 to 4 weight percent. Melt indexes (MIs) of the modified ethylene polymers as measured by ASTM D 1238, at 190° C., 2.16 kg, are preferably 1 to 20 dg/min.

The grafting reaction is carried out at a temperature selected to minimize or avoid rapid vaporization and consequent losses of the graft monomer and any catalyst that may be employed. The graft monomer concentration in the reactor is typically about 1 to about 5 wt. % based on the total reaction mixture weight. The preferred temperature profile is where the temperature of the polyolefin melt increases gradually through the length of the extruder/reactor up to a maximum in the grafting reaction zone and then decreases toward the reactor exit. The maximum temperature within the reactor should be such that significant vaporization losses and/or premature decomposition of any peroxide catalyst are avoided. The grafting monomer and any catalyst used are preferably added in neat form to the extruder/reactor.

In general, the tie-layer composition comprises a triblock copolymer composition. The triblock copolymer composition comprises a styrene-butadiene-styrene (SBS) triblock copolymer, a styrene-isoprene-styrene (SIS) triblock copolymer, and/or any combination of SBS and SIS triblock copolymers. In general, the tie-layer composition contains from 20 to 50 wt. %, based upon the total weight of the tie-layer composition, of a triblock copolymer composition. The tie-layer composition may contain from 25 to 40 wt. %, based upon the total weight of the tie-layer composition, of a triblock copolymer composition. The tie-layer composition may contain from 27 to 38 wt. %, based upon the total weight of the tie-layer composition, of a triblock copolymer composition. The tie-layer composition may contain from about 29 to about 33 wt. %, based upon the total weight of the tie-layer composition, of a triblock copolymer composition. The tie-layer composition may contain about 30 wt. %, based upon the total weight of the tie-layer composition, of a triblock copolymer composition. The tie-layer composition may contain about 31 wt. %, based upon the total weight of the tie-layer composition, of a triblock copolymer composition. The tie-layer composition may contain about 32 wt. %, based upon the total weight of the tie-layer composition, of a triblock copolymer composition.

In some embodiments, the triblock copolymer composition comprises a styrene-butadiene-stryene (SBS) triblock copolymer and/or a styrene-isoprene-styrene (SIS) block copolymer. In some embodiments, the triblock copolymer composition comprises: (1) from about 45 to about 55 wt. %, based upon the total weight of the triblock copolymer composition, of a SBS triblock copolymer; and (2) from about 45 to about 55 wt. %, based upon the total weight of the triblock copolymer composition, of a SIS triblock copolymer. In some embodiments, the triblock copolymer composition comprises: (1) from about 48 to about 52 wt. %, based upon the total weight of the triblock copolymer composition, of a SBS triblock copolymer; and (2) from about 48 to about 52 wt. %, based upon the total weight of the triblock copolymer composition, of a SIS triblock copolymer. In some embodiments, the triblock copolymer composition comprises: (1) from about 49 to about 51 wt. %, based upon the total weight of the triblock copolymer composition, of a SBS triblock copolymer; and (2) from about 49 to about 51 wt. %, based upon the total weight of the triblock copolymer composition, of a SIS triblock copolymer. In some embodiments, the triblock copolymer composition comprises: (1) from about 50 wt. %, based upon the total weight of the triblock copolymer composition, of a SBS triblock copolymer; and (2) from about 50 wt. %, based upon the total weight of the triblock copolymer composition, of a SIS triblock copolymer.

In some embodiments, the tie-layer composition comprises a styrene-butadiene-stryene (SBS) triblock copolymer and a styrene-isoprene-styrene (SIS) block copolymer. In some embodiments, the tie-layer composition comprises a combined amount of about 20 to about 50 wt. %, based upon the total weight of the tie-layer composition, of composition comprising a styrene-butadiene-stryene (SBS) triblock copolymer and a styrene-isoprene-styrene (SIS) block copolymer. In some embodiments, the tie-layer composition comprises: (1) from about 10 to about 25 wt. %, based upon the total weight of the tie-layer composition, of a SBS triblock copolymer; and (2) from about 10 to about 25 wt. %, based upon the total weight of the tie-layer composition, of a SIS triblock copolymer. In some embodiments, the tie-layer composition comprises: (1) from about 12 to about 18 wt. %, based upon the total weight of the tie-layer composition, of a SBS triblock copolymer; and (2) from about 12 to about 18 wt. %, based upon the total weight of the triblock copolymer composition, of a SIS triblock copolymer. In some embodiments, the tie-layer composition comprises: (1) from about 14 to about 17 wt. %, based upon the total weight of the tie-layer composition, of a SBS triblock copolymer; and (2) from about 14 to about 17 wt. %, based upon the total weight of the triblock copolymer composition, of a SIS triblock copolymer.

In some embodiments, the tie-layer composition comprises: (1) about 14 wt. %, based upon the total weight of the tie-layer composition, of a SBS triblock copolymer; and (2) about 14 wt. %, based upon the total weight of the triblock copolymer composition, of a SIS triblock copolymer. In some embodiments, the tie-layer composition comprises: (1) about 15 wt. %, based upon the total weight of the tie-layer composition, of a SBS triblock copolymer; and (2) about 15 wt. %, based upon the total weight of the triblock copolymer composition, of a SIS triblock copolymer. In some embodiments, the tie-layer composition comprises: (1) about 15.5 wt. %, based upon the total weight of the tie-layer composition, of a SBS triblock copolymer; and (2) about 15.5 wt. %, based upon the total weight of the triblock copolymer composition, of a SIS triblock copolymer. In some embodiments, the tie-layer composition comprises: (1) about 16 wt. %, based upon the total weight of the tie-layer composition, of a SBS triblock copolymer; and (2) about 16 wt. %, based upon the total weight of the triblock copolymer composition, of a SIS triblock copolymer.

In some embodiments, the weight ratio of styrene-isoprene-styrene (SIS) triblock copolymer to styrene-butadiene-styrene (SBS) triblock copolymer is from 5:1 to 1:5. The weight ratio of styrene-isoprene-styrene triblock copolymer to styrene-butadiene-styrene triblock copolymer may be from 4:1 to 1:4. The weight ratio of styrene-isoprene-styrene triblock copolymer to styrene-butadiene-styrene triblock copolymer may be from 3:1 to 1:3. The weight ratio of styrene-isoprene-styrene triblock copolymer to styrene-butadiene-styrene triblock copolymer may be from 2:1 to 1:2. The weight ratio of styrene-isoprene-styrene triblock copolymer to styrene-butadiene-styrene triblock copolymer may be 1:1.

In some embodiments, the styrene-butadiene-styrene (SBS) triblock copolymer has a melt flow rate from 10 to 30 g/10 min (measured according to ASTM D 1238 at 200° C./5 kg). The SBS triblock copolymer may have a melt flow rate from about 12 to 28 g/10 min (measured according to ASTM D 1238 at 200° C./5 kg). The SBS triblock copolymer may have a melt flow rate from about 14 to 26 g/10 min (measured according to ASTM D 1238 at 200° C./5 kg). The SBS triblock copolymer may have a melt flow rate of about 14 g/10 min (measured according to ASTM D 1238 at 200° C./5 kg). The SBS triblock copolymer may have a melt flow rate of about 15 g/10 min (measured according to ASTM D 1238 at 200° C./5 kg). The SBS triblock copolymer may have a melt flow rate of about 16 g/10 min (measured according to ASTM D 1238 at 200° C./5 kg). The SBS triblock copolymer may have a melt flow rate of about 17 g/10 min (measured according to ASTM D 1238 at 200° C./5 kg). The SBS triblock copolymer may have a melt flow rate of about 18 g/10 min (measured according to ASTM D 1238 at 200° C./5 kg). The SBS triblock copolymer may have a melt flow rate of about 19 g/10 min (measured according to ASTM D 1238 at 200° C./5 kg). The SBS triblock copolymer may have a melt flow rate of about 20 g/10 min (measured according to ASTM D 1238 at 200° C./5 kg). The SBS triblock copolymer may have a melt flow rate of about 21 g/10 min (measured according to ASTM D 1238 at 200° C./5 kg). The SBS triblock copolymer may have a melt flow rate of about 22 g/10 min (measured according to ASTM D 1238 at 200° C./5 kg). The SBS triblock copolymer may have a melt flow rate of about 23 g/10 min (measured according to ASTM D 1238 at 200° C./5 kg). The SBS triblock copolymer may have a melt flow rate of about 24 g/10 min (measured according to ASTM D 1238 at 200° C./5 kg).

In some embodiments, the styrene-butadiene-styrene triblock copolymer contains from 30 to 55 wt. % styrene, based upon the total weight of the styrene-butadiene-styrene triblock copolymer. The styrene-butadiene-styrene triblock copolymer may contain from 35 to 50 wt. % styrene, based upon the total weight of the styrene-butadiene-styrene triblock copolymer. The styrene-butadiene-styrene triblock copolymer may contain from about 40 to about 45 wt. % styrene, based upon the total weight of the styrene-butadiene-styrene triblock copolymer. The styrene-butadiene-styrene triblock copolymer may contain about 40 wt. % styrene, based upon the total weight of the styrene-butadiene-styrene triblock copolymer. The styrene-butadiene-styrene triblock copolymer may contain about 41 wt. % styrene, based upon the total weight of the styrene-butadiene-styrene triblock copolymer. The styrene-butadiene-styrene triblock copolymer may contain about 42 wt. % styrene, based upon the total weight of the styrene-butadiene-styrene triblock copolymer. The styrene-butadiene-styrene triblock copolymer may contain about 43 wt. % styrene, based upon the total weight of the styrene-butadiene-styrene triblock copolymer. The styrene-butadiene-styrene triblock copolymer may contain about 44 wt. % styrene, based upon the total weight of the styrene-butadiene-styrene triblock copolymer. The styrene-butadiene-styrene triblock copolymer may contain about 45 wt. % styrene, based upon the total weight of the styrene-butadiene-styrene triblock copolymer.

In some embodiments, the styrene-isoprene-styrene (SIS) triblock copolymer has a melt flow rate from about 20 to about 45 g/10 min (measured according to ASTM D 1238 at 200° C./5 kg). The SIS triblock copolymer may have a melt flow rate from about 25 to about 43 g/10 min (measured according to ASTM D 1238 at 200° C./5 kg). The SIS triblock copolymer may have a melt flow rate from about 30 to about 40 g/10 min (measured according to ASTM D 1238 at 200° C./5 kg). The SIS triblock copolymer may have a melt flow rate from about 35 to about 40 g/10 min (measured according to ASTM D 1238 at 200° C./5 kg). The SIS triblock copolymer may have a melt flow rate of about 35 g/10 min (measured according to ASTM D 1238 at 200° C./5 kg). The SIS triblock copolymer may have a melt flow rate of about 36 g/10 min (measured according to ASTM D 1238 at 200° C./5 kg). The SIS triblock copolymer may have a melt flow rate of about 37 g/10 min (measured according to ASTM D 1238 at 200° C./5 kg). The SIS triblock copolymer may have a melt flow rate of about 38 g/10 min (measured according to ASTM D 1238 at 200° C./5 kg). The SIS triblock copolymer may have a melt flow rate of about 39 g/10 min (measured according to ASTM D 1238 at 200° C./5 kg). The SIS triblock copolymer may have a melt flow rate of about 40 g/10 min (measured according to ASTM D 1238 at 200° C./5 kg).

In some embodiments, the styrene-isoprene-styrene triblock copolymer contains from 30 to 55 wt. % styrene, based upon the total weight of the styrene-isoprene-styrene triblock copolymer. The styrene-isoprene-styrene triblock copolymer may contain from 35 to 50 wt. % styrene, based upon the total weight of the styrene-isoprene-styrene triblock copolymer. The styrene-isoprene-styrene triblock copolymer may contain from about 40 to about 45 wt. % styrene, based upon the total weight of the styrene-isoprene-styrene triblock copolymer. The styrene-isoprene-styrene triblock copolymer may contain about 40 wt. % styrene, based upon the total weight of the styrene-isoprene-styrene triblock copolymer. The styrene-isoprene-styrene triblock copolymer may contain about 41 wt. % styrene, based upon the total weight of the styrene-isoprene-styrene triblock copolymer. The styrene-isoprene-styrene triblock copolymer may contain about 42 wt. % styrene, based upon the total weight of the styrene-isoprene-styrene triblock copolymer. The styrene-isoprene-styrene triblock copolymer may contain about 43 wt. % styrene, based upon the total weight of the styrene-isoprene-styrene triblock copolymer. The styrene-isoprene-styrene triblock copolymer may contain about 44 wt. % styrene, based upon the total weight of the styrene-isoprene-styrene triblock copolymer. The styrene-isoprene-styrene triblock copolymer may contain about 45 wt. % styrene, based upon the total weight of the styrene-isoprene-styrene triblock copolymer.

In some embodiments, the tie-layer composition or the triblock copolymer composition has a 1:1 weight ratio of styrene-butadiene-styrene triblock copolymer and styrene-isoprene-styrene triblock copolymer. When the weight ratio of the SBS and SIS triblock copolymers is equal to 1:1, there is a difference in the melt flow rate of the SBS triblock copolymer and the SIS triblock copolymer of at least 4 g/10 min, based upon the individually measured melt flow rate of each triblock copolymer. In some examples, there is a difference in the melt flow rate of the SBS triblock copolymer and the SIS triblock copolymer of at least 5 g/10 min, based upon the individually measured melt flow rate of each triblock copolymer. There may be a difference in the melt flow rate of the SBS triblock copolymer and the SIS triblock copolymer of at least 6 g/10 min, 7 g/10 min, 8 g/10 min, 9 g/10 min, 10 g/10 min, 12 g/10 min, 13 g/10 min, 14 g/10 min, 15 g/10 min, 16 g/10 min, 17 g/10 min, 18 g/10 min, 19 g/10 min, 20 g/10 min, or up to 60 g/10 min, based upon the individually measured melt flow rate of each triblock copolymer.

In some embodiments, the tie-layer compositions may include a low density polyethylene (LDPE). More specifically, the tie-layer composition may include from 0.001 to 20 wt. %, based upon the total weight of the tie-layer composition, of a low density polyethylene (LDPE). In some embodiments, the LDPE is present in an amount from 1 to 15 wt. %, based upon the total weight of the tie-layer composition. In preferred embodiments, the LDPE may be present in an amount from 7 to 12 wt. %, based upon the total weight of the tie-layer composition. In specific embodiments, the LDPE may be present in an amount from about 9 to 11 wt. %, based upon the total weight of the tie-layer composition. In particular embodiments, the LDPE may be present in about 8 wt. %, based upon the total weight of the tie-layer composition. In some embodiments, the LDPE may be present in about 9 wt. %, based upon the total weight of the tie-layer composition. In specific embodiments, the LDPE may be present in about 10 wt. %, based upon the total weight of the tie-layer composition. In additional embodiments, the LDPE may be present in about 11 wt. %, based upon the total weight of the tie-layer composition.

The LDPE can be an ethylene homopolymer or ethylene copolymerized with one or more monomers, such as vinyl acetate, methyl acrylate, acrylic acid, ethyl acrylate, or a $C_3$ to $C_{10}$ α-olefin. The LDPE can have a density from about 0.910 to about 0.925 grams per cubic centimeter, and preferably from about 0.915 to about 0.920 grams per cubic centimeter. The LDPE can have a melt index, measured according to ASTM D 1238 at a load of 2.16 kg and a temperature of 190 degrees Celsius, ranging from about 0.10 to about 25.0 grams per 10 minutes, preferably from about 0.1 to about 10.0 grams per 10 minutes, more preferably, from about 0.1 to about 1.0 grams per 10 minutes. More specifically, the LDPE has a melt index of 0.25 g/10 minutes, measured according to ASTM D 1238 at a load of 2.16 kg and a temperature of 190 degrees Celsius. In a specific embodiment, the LDPE is an ethylene homopolymer with a density of about 0.918 grams per cubic centimeter and a melt index of about 0.25 grams per 10 minutes.

The LDPE is preferably prepared by free radical, high pressure polymerization, in particular by using a tubular or autoclave high pressure polymerization process in the presence of a free radical initiator.

The tie-layer compositions can further comprise additives such as stabilizers, UV absorbers, metal deactivators, thio-synergists, peroxide scavengers, basic co-stabilizers, acid scavengers, nucleating agents, clarifiers, conventional fillers, dispersing agents, plasticizers, lubricants, emulsifiers, pigments, flow-control agents, optical brighteners, flame-proofing agents, antistatic agents, blowing agents, and mixtures thereof. In some embodiments, the tie-layer composition may include 0.001 to 2 wt. %, based upon the total weight of the tie-layer composition, of a primary additive. In some examples, the primary additive is an antioxidant. In some embodiments, the tie-layer composition may include 0.001 to 2 wt. %, based upon the total weight of the tie-layer composition, of a secondary additive. In some examples, the secondary additive is an antioxidant. In specific embodiments, the primary additive and/or the secondary additive may be a processing stabilizer, and/or a sterically hindered phenolic primary antioxidant. In specific embodiments, the tie-layer composition includes 0.1 wt. %, based upon the total weight of the tie-layer composition, of a sterically hindered phenolic antioxidant. The sterically hindered phenolic antioxidant may be tetrakis [methylene(3,5-di-(tert)-butyl-4-hydroxyhydrocinnamate)]methane. In specific embodiments, the tie-layer composition includes 0.1 wt. %, based upon the total weight of the tie-layer composition, of a hydrolytically stable phosphite processing stabilizer. The hydrolytically stable phosphite processing stabilizer may be tris(2,4-ditert-butylphenyl)phosphite.

Barrier Layers

In some embodiments, the multilayer structure may include at least one barrier layer. A barrier layer may include ethylene vinyl alcohol copolymer (EVOH), polyamides such as nylon 6, nylon 6,6, nylon 12, nylon 6,12, nylon 6,66 and blends thereof, as well as co-extruded structures of EVOH and polyamides, such as EVOH/polyamide and polyamide/EVOH/polyamide. Barrier layers also include polyvinylidene chloride (PVDC) and polychlorotrifluoroethylene (PCTFE). Preferably, the barrier layers are selected from EVOH, polyamides or co-extruded structures thereof. More preferably, the barrier layer is EVOH.

The multilayer structures be in the form of film(s) or sheet(s), which may be further thermoformed or oriented, and can be produced using conventional methods and extrusion equipment well known to those skilled in the art, where layers of polymer melts are combined by introducing multiple polymer melt streams into a combining block/manifold or die which then directs the melt streams to flow together (while still in the block/manifold or die), then exiting the die together as a single flow stream. Alternately, multiple polymer melt streams can be introduced into a die and then combined just after exiting the die.

In some embodiments, at least one tie layer is used to bond adjacent layers of the barrier, propylene polymer, styrene polymer and polyethylene layers. Each of the tie layers present in the multilayer structure is the same.

The propylene polymer layer, styrene polymer layer, polyethylene layer, and when present, the barrier layer, may be positioned relative to one another in any way required for the demands of a particular application. Preferably, the multilayer structure contains a barrier layer.

The multilayer structures may also include additional layers of propylene polymer, polyethylene, styrene polymers, barrier layers, polyamides or metal layers, provided that when a tie-layer is used it is the same as the other tie layers in the structure. Preferably, the multilayer structure is selected from:

PS/tie-layer/barrier/tie-layer/PP/tie-layer/PE
HIPS/tie-layer/barrier/tie-layer/PE/tie-layer/PP
PS/tie-layer/barrier/tie-layer/PE/tie-layer/PP HIPS/tie-layer/barrier/tie-layer/PP/tie-layer/PE
PS+HIPS/tie-layer/barrier/tie-layer/PP/tie-layer/PE
PS+HIPS/tie-layer/barrier/tie-layer/PE/tie-layer/PP.
More preferably, the multilayer structure is
PS+HIPS/tie-layer/barrier/tie-layer/PP/tie-layer/PE or
PS+HIPS/tie-layer/barrier/tie-layer/PE/tie-layer/PP.

The following examples illustrate the invention; however, those skilled in the art will recognize numerous variations within the spirit of the invention and scope of the claims.

To facilitate a better understanding of the present invention, the following examples of preferred embodiments are given. In no way should the following examples be read to limit, or to define, the scope of the invention.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The following examples provide compositions that are useful as tie-layer adhesive compositions. The exemplary tie-layer adhesive compositions may be used to bond styrenic polymers such as polystyrene (PS) and high impact polystyrene (HIPS) to other polymer layers in multi-layer structures. The adhesives as disclosed herein are particularly useful in bonding styrenic polymers to oxygen barrier layers such as ethylene vinyl alcohol (EVOH) or polyamide (PA) or combination thereof in coextruded barrier structures. The adhesive compositions as disclosed herein are useful in bonding to structural layers such as polyolefin layers such as polyethylene (PE) or polypropylene (PP) or blends thereof.

The tie-layer compositions as disclosed herein were investigated through three main approaches: (1) tie-layer adhesives compositions having specific styrenic elastomer composition; (2) tie-layer adhesives compositions containing LDPE and styrene rubbers; and (3) mLLDPE based tie-layer adhesive compositions.

Raw materials used herein include, but are not limited to:

PLEXAR® PMG2300: HDPE grafted with 1.9% maleic anhydride (MAH)

PETROTHENE® GA502019: 2 MI, 0.918 density butene LLDPE

PETROTHENE® NA940000: 0.25 MI, 0.918 density LDPE

GM1835CAX01: 3.5 MI, 0.918 density hexene mLLDPE

Kraton D1155: SBS, 40% styrene, 14 MFR*, <1% diblock

Kraton D1162: SIS, 44% styrene, 35 MFR*, <1% diblock

VECTOR 6241A: SBS, 43% styrene, 23 MFR*, <1% diblock

VECTOR 4411A: SIS, 44% styrene, 40 MFR*, <1% diblock

IRGANOX 1010 FF: Primary A/O

IRGAFOS 168: Secondary A/0

MFR*: ASTM D1238, 200C/5 kg

Table 1 provides a summary of each tie-layer adhesive used in the examples described herein.

TABLE 1

Tie-Layer Compositions
(wt. % based upon the total weight of the tie-layer composition)

| | First Grafted | Copolymer | | | Tri-Block Copolymer Composition | | | | $1^{st}$ Additive (Irganox 1010) | $2^{nd}$ Additive (IRGAFOS 168) |
|---|---|---|---|---|---|---|---|---|---|---|
| | HDPE | LLDPE | mLLDPE | LDPE | Vector 6241A | Vector 4411A | Kraton D1155 | Kraton D1162 | | |
| Ex. 1 | 10 | 59.8 | — | — | — | — | 30 | — | 0.1 | 0.1 |
| Ex. 2 | 10 | 49.8 | — | 10 | — | — | 30 | — | 0.1 | 0.1 |
| Ex. 3 | 10 | 59.8 | — | — | — | — | 15 | 15 | 0.1 | 0.1 |
| Ex. 4 | 10 | 49.8 | — | 10 | — | — | 15 | 15 | 0.1 | 0.1 |
| Ex. 5 | 10 | — | 57.8 | — | — | — | 16 | 16 | 0.1 | 0.1 |
| Ex. 6 | 10 | — | 47.8 | 10 | — | — | 16 | 16 | 0.1 | 0.1 |
| Ex. 7 | 10 | 57.8 | — | — | — | — | 16 | 16 | 0.1 | 0.1 |
| Ex. 8 | 10 | — | 57.8 | — | — | — | 16 | 16 | 0.1 | 0.1 |
| Ex. 9 | 10 | 49.8 | — | 10 | — | — | 15 | 15 | 0.1 | 0.1 |
| Ex. 10 | 10 | — | 49.8 | 10 | — | — | 15 | 15 | 0.1 | 0.1 |
| Ex. 11 | 10 | — | 47.8 | 10 | — | — | 16 | 16 | 0.1 | 0.1 |
| Ex. 12 | 10 | 59.8 | — | — | 15 | 15 | — | — | 0.1 | 0.1 |
| Ex. 13 | 10 | 58.8 | — | — | 15.5 | 15.5 | — | — | 0.1 | 0.1 |
| Ex. 14 | 10 | 57.8 | — | — | 16 | 16 | — | — | 0.1 | 0.1 |
| Ex. 15 | 10 | 59.8 | — | — | — | — | 15 | 15 | 0.1 | 0.1 |
| Ex. 16 | 10 | 57.8 | — | — | — | — | 16 | 16 | 0.1 | 0.1 |
| Ex. 17 | 10 | — | 59.8 | — | 15 | 15 | — | — | 0.1 | 0.1 |
| Ex. 18 | 10 | — | 58.8 | — | 15.5 | 15.5 | — | — | 0.1 | 0.1 |
| Ex. 19 | 10 | — | 57.8 | — | 16 | 16 | — | — | 0.1 | 0.1 |
| Ex. 20 | 10 | — | 59.8 | — | — | — | 15 | 15 | 0.1 | 0.1 |
| Ex. 21 | 10 | — | 49.8 | 10 | — | — | 15 | 15 | 0.1 | 0.1 |
| Ex. 22 | 10 | — | 57.8 | — | — | — | 16 | 16 | 0.1 | 0.1 |

Testing Procedure:

The tie-layer composition is coextruded with a styrenic polymer (50/50 blend of polystyrene and high impact polystyrene) and an EVOH resin having 32 mol. %, based upon the total weight of the EVOH resin, of ethylene derived units to produce a multi-layer coextruded film having a total thickness of 24 mils and having the following construction and weight percentage of each component:

| 43% Styrene Polymer | 4% Adhesive layer | 6% EVOH | 4% Adhesive layer | 43% Styrenic polymer |
|---|---|---|---|---|

The adhesion strength of styrenic polymer/adhesive interface is measure in pounds per linear inches (PLI) in accordance with ASTM D 1876. TABLE 2 shows the adhesion properties for each example disclosed herein.

TABLE 2

Summary of Adhesion Results (pounds per linear inch)

| | 24 mil - 1 day | 24 mil - 4 day |
|---|---|---|
| Effect of LDPE on Adhesion to PS Substrates | | |
| Ex. 1 | 0.18 | 0.19 |
| Ex. 2 | 0.43 | 0.47 |
| Ex. 3 | 2.50 | 2.40 |
| Ex. 4 | 3.05 | 2.87 |
| Ex. 5 | 2.94 | 2.79 |
| Ex. 6 | 5.36 | 5.10 |
| Effect of mLLDPE on PS Adhesion in Formulations Containing SIS and SBS | | |
| Ex. 7 | 2.05 | 1.98 |
| Ex. 8 | 2.94 | 2.79 |
| Effect of mLLDPE on PS Adhesion in Formulations Containing SIS, SBS and LDPE | | |
| Ex. 9 | 1.38 | 1.29 |
| Ex. 10 | 1.69 | 1.50 |
| Ex. 11 | 5.36 | 5.10 |
| Effect of Rubber Structure (Kraton vs. Vector) on Adhesion to PS Substrates | | |
| Ex. 12 | 0.13 | 0.12 |
| Ex. 13 | 0.16 | 0.14 |
| Ex. 14 | 0.19 | 0.16 |
| Ex. 15 | 0.73 | 0.59 |
| Ex. 16 | 2.05 | 1.98 |
| Effect of Rubber Structure (Kraton vs. Vector) with mLLDPE on Adhesion to PS Substrates | | |
| Ex. 17 | 0.20 | 0.15 |
| Ex. 18 | 0.17 | 0.13 |
| Ex. 19 | 0.32 | 0.25 |
| Ex. 20 | 1.01 | 0.96 |
| Ex. 21 | 1.69 | 1.50 |
| Ex. 22 | 2.94 | 2.79 |

In summary, preferred multilayered structures include tie-layers that contain Kraton D1155 (SBS), Kraton D1162 (SIS), a metallocene derived linear low density polyethylene and a low density polyethylene.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A multilayer structure comprising:
    (A) a first polyolefin layer;
    (B) a styrene polymer layer;
    (C) a second polyolefin layer; and
    (D) at least one tie-layer comprising a tie-layer composition comprising:
        (1) 25 to 75 wt. %, based upon the total weight of the tie-layer composition, of a first copolymer, wherein the first copolymer comprises ethylene derived units and units derived from a $C_{4-8}$ α-olefin;
        (2) 5 to 25 wt. %, based upon the total weight of the tie-layer composition, of a polyethylene resin grafted with an ethylenically unsaturated carboxylic acid or acid derivative;
        (3) 20 to 50 wt. %, based upon the total weight of the tie-layer composition, of a triblock copolymer composition, wherein the triblock copolymer composition comprises: (1) from about 45 to about 55 wt. %, based upon the total weight of the triblock copolymer composition, of a SBS triblock copolymer; and (2) from about 45 to about 55 wt. %, based upon the total weight of the triblock copolymer composition, of a SIS triblock copolymer; and
        (4) optionally, 0.001 to 20 wt. %, based upon the total weight of the tie-layer composition, of a low density polyethylene (LDPE);
    wherein the multilayer structure has the following arrangement:
    the first polyolefin layer/at least one tie-layer/the styrene polymer layer/at least one tie-layer/the second polyolefin layer.

2. The multilayer structure of claim 1, wherein the tie-layer composition has a melt flow rate of 1-5 g/min.

3. The multilayer structure of claim 1, wherein the first copolymer is derived from a metallocene.

4. The multilayer structure of claim 1 further comprising a barrier layer selected from EVOH, polyamides, co-extruded structures of EVOH and polyamides, polyvinylidene chloride, or polychlorotrifluoroethylene.

5. The multilayer structure of claim 4, wherein the barrier layer is selected from EVOH, polyamides or co-extruded structures of EVOH and polyamides.

6. The multilayer structure of claim 5, wherein the barrier layer is EVOH.

7. The multilayer structure of claim 5, wherein the polyamides are selected from nylon 6, nylon 6,6, nylon 12, nylon 6,12, nylon 6,66 or mixtures thereof.

8. The multilayer structure of claim 4, wherein the co-extruded structures of EVOH and polyamides are selected from polyamide/EVOH/polyamide or EVOH/poly amide.

9. The multilayer structure of claim 1, wherein the styrene polymer layer is a blend of polystyrene and high impact polystyrene.

10. The multilayer structure of claim 1, wherein the melt index of the styrene-butadiene-styrene triblock copolymer is 12 to 20 g/10 min.

11. The multilayer structure of claim 1 selected from the group consisting of:
    PS/tie-layer/barrier/tie-layer/PP/tie-layer/PE,
    HIPS/tie-layer/barrier/tie-layer/PE/tie-layer/PP,
    PS/tie-layer/barrier/tie-layer/PE/tie-layer/PP,
    HIPS/tie-layer/barrier/tie-layer/PP/tie-layer/PE, PS+HIPS/tie-layer/barrier/tie-layer/PP/tie-layer/PE,
PS+HIPS/tie-layer/barrier/tie-layer/PE/tie-layer/PP,
PS/tie-layer/barrier/tie-layer/PE+PP
HIPS/tie-layer/barrier/tie-layer/PE+PP, and
PS+HIPS/tie-layer/barrier/tie-layer/PE+PP.

12. The multilayer structure of claim 11, selected from the group consisting of:
HIPS/tie-layer/barrier/tie-layer/PE+PP, and
PS+HIPS/tie-layer/barrier/tie-layer/PE+PP.

13. The multilayer structure of claim 1, wherein the polyethylene resin is grafted with 0.5 to 5 weight percent maleic anhydride and has a melt index from 0.5 to 20 g/10 min.

14. The multilayer structure of claim 13, wherein the polyethylene resin has a density from 0.945 to 0.965 g/cm$^3$ and is grafted with 0.75 to 2.5 weight percent maleic anhydride.

15. The multilayer structure of claim 13, wherein the polyethylene resin has a density from 0.910 to 0.930 g/cm$^3$ and is grafted with 0.75 to 2.5 weight percent maleic anhydride.

16. The multilayer structure of claim 1, wherein the triblock copolymer composition has a weight ratio of styrene-isoprene-styrene (SIS) triblock copolymer to styrene-butadiene-styrene (SBS) triblock copolymer from 5:1 to 1:5.

* * * * *

UNITED STATES PATENT AND TRADEMARK OFFICE
CERTIFICATE OF CORRECTION

PATENT NO. : 9,662,864 B2
APPLICATION NO. : 14/260894
DATED : May 30, 2017
INVENTOR(S) : Maged G. Botros Page 1 of 1

It is certified that error appears in the above-identified patent and that said Letters Patent is hereby corrected as shown below:

In the Specification

Column 3   Line 57   Delete "C4-8" and insert --$C_{4-8}$--
Column 6   Line 19   Delete "C4-8" and insert --$C_{4-8}$--
Column 18   Line 26   Delete "A/0" and insert --A/O--

Signed and Sealed this
Fourth Day of February, 2020

Andrei Iancu
*Director of the United States Patent and Trademark Office*